Inventor
Leonard D. Soubier
By J. F. Rule,
Attorney

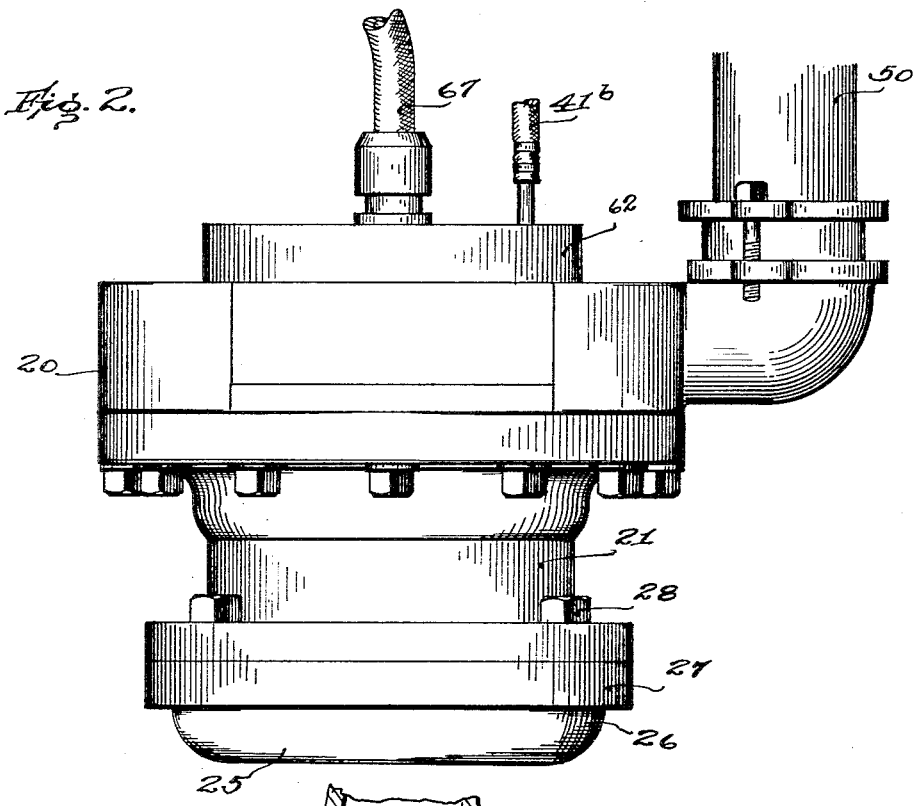
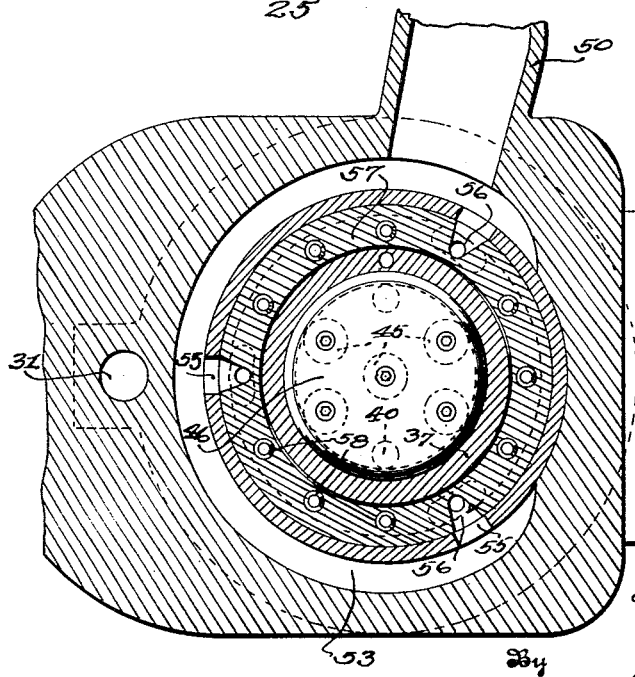

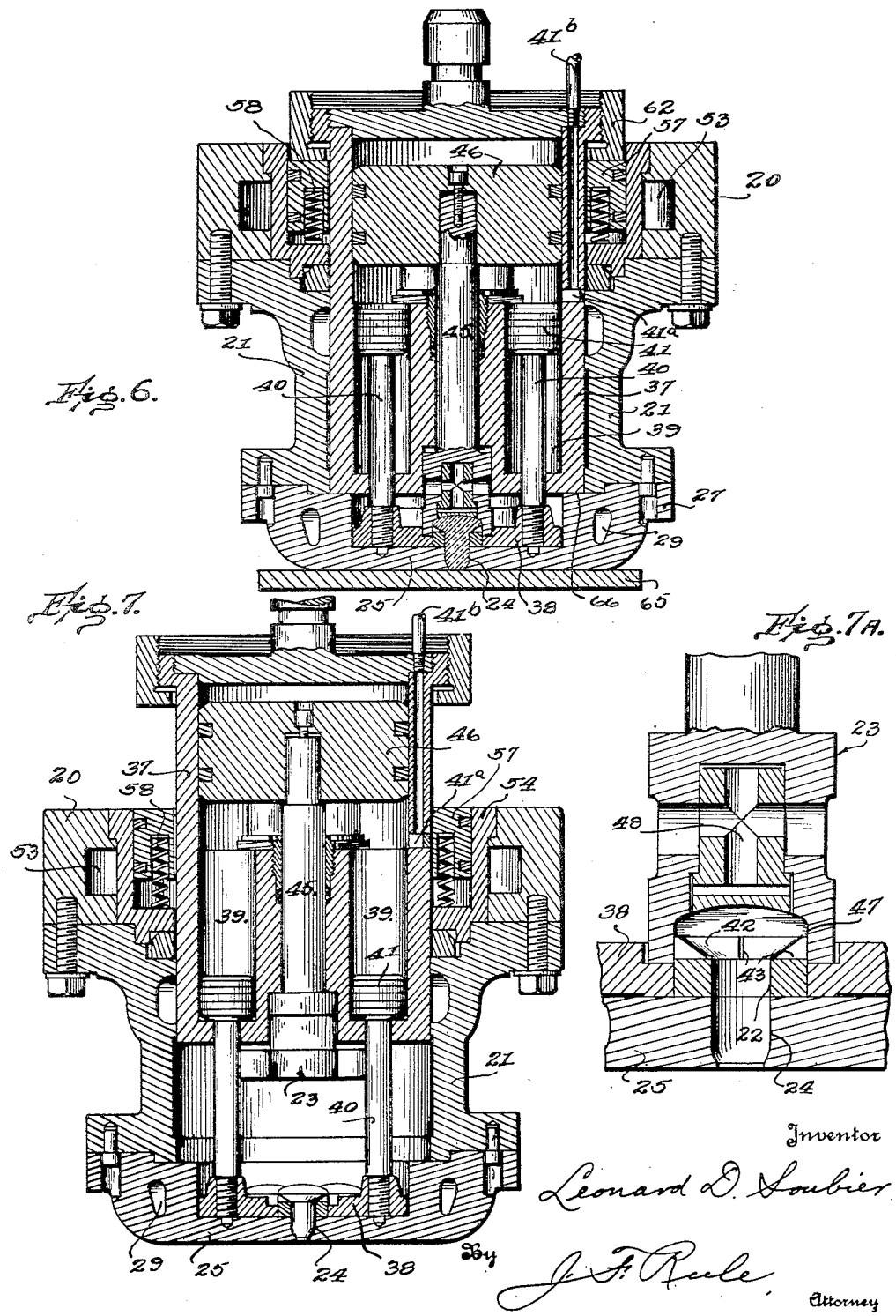

June 27, 1933.  L. D. SOUBIER  1,916,179
MACHINE FOR FORMING GLASS STOPPERS
Filed Sept. 29, 1931   6 Sheets-Sheet 5

Inventor
Leonard D. Soubier
By J. F. Rule, Attorney

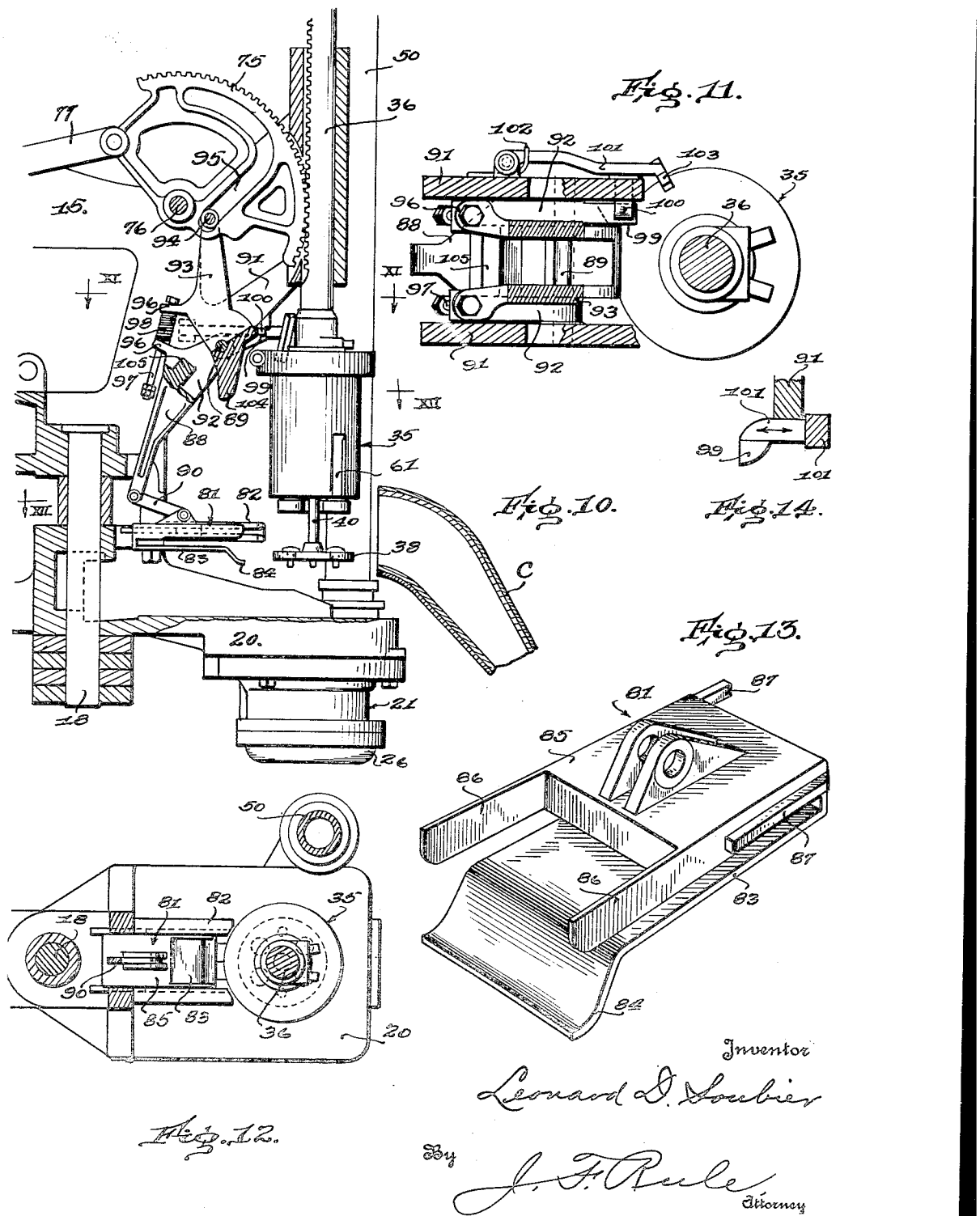

Patented June 27, 1933

1,916,179

UNITED STATES PATENT OFFICE

LEONARD D. SOUBIER, OF WOONSOCKET, RHODE ISLAND, ASSIGNOR TO OWENS-ILLINOIS GLASS COMPANY, A CORPORATION OF OHIO

MACHINE FOR FORMING GLASS STOPPERS

Application filed September 29, 1931. Serial No. 565,770.

The present invention relates to improvements in machines for forming glass stoppers.

An object of the invention is the provision of a completely automatic machine in which the mold charges of molten glass are gathered by suction from a supply body of molten glass and later compacted in order to form perfect stoppers in which the density of the glass is considerably greater than in articles produced by suction alone. To this end the stopper molds are of such form that their capacity may be reduced following the charging and severing operations so that the density of the glass is increased considerably and all portions of the molds are completely filled.

Another object of the invention is the provision of a stopper forming unit which may be substituted for a mold group on a standard bottle forming machine of the well known Owens type, without the necessity of radically altering the usual construction involved. To this end the stopper forming unit is mounted upon the usual dipping frame and employs substantially the original plunger operating mechanism for moving certain of the mold elements.

A further object is the provision of a novel form of mechanism for removing the finished stoppers from the molds. To this end there is provided a single unit which removes the stoppers from one of the mold elements and then pushes them into a chute or other receiver.

Other objects will be in part apparent and in part pointed out hereinafter.

In the drawings:

Fig. 2 is a detail elevational view of one of the stopper units.

Fig. 3 is a horizontal sectional view taken substantially along the line III—III of Fig. 4.

Fig. 6 is a vertical sectional view similar to Fig. 4 showing the relative positions of the parts immediately after the charge severing and glass compacting operations.

Fig. 7 is a view similar to Fig. 6 showing the next succeeding position of the parts of the gathering and forming units.

Fig. 7—A is a detail sectional view of one of the complete molds.

Figure 1:
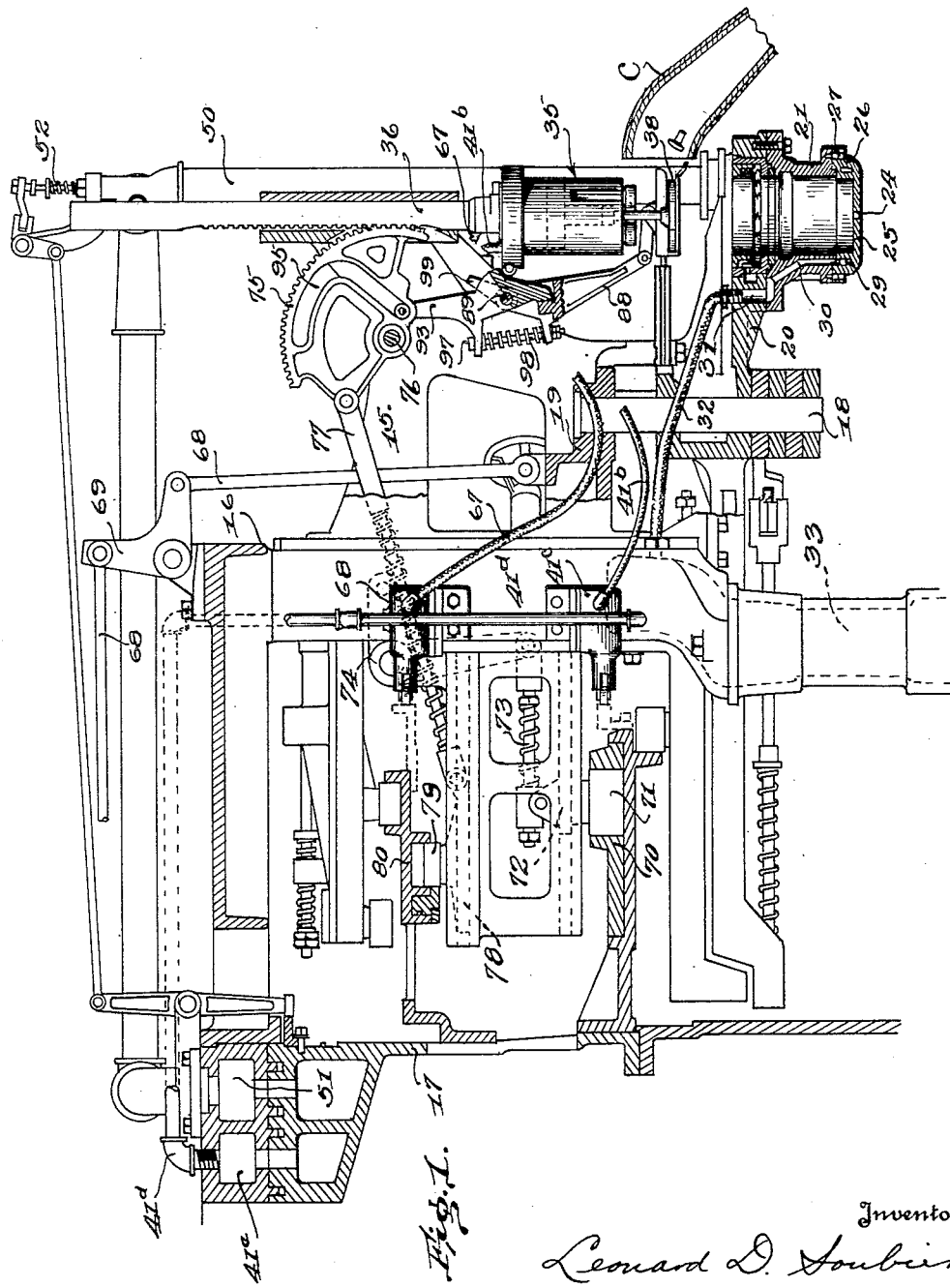
Fig. 1 is a sectional elevational view showing one head or mold group of a forming machine embodying my invention.
Figure 4:
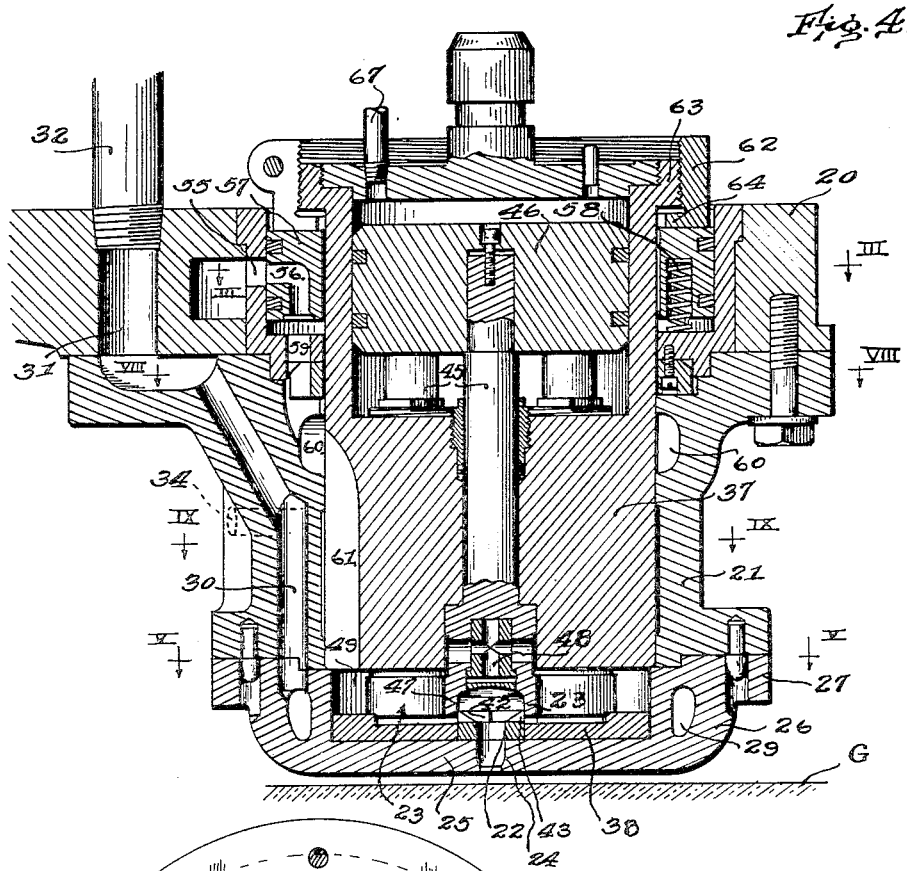
Fig. 4 is a sectional elevational view of one of the stopper units with the parts thereof occupying the positions assumed just prior to the charge gathering operation.
Figure 8:
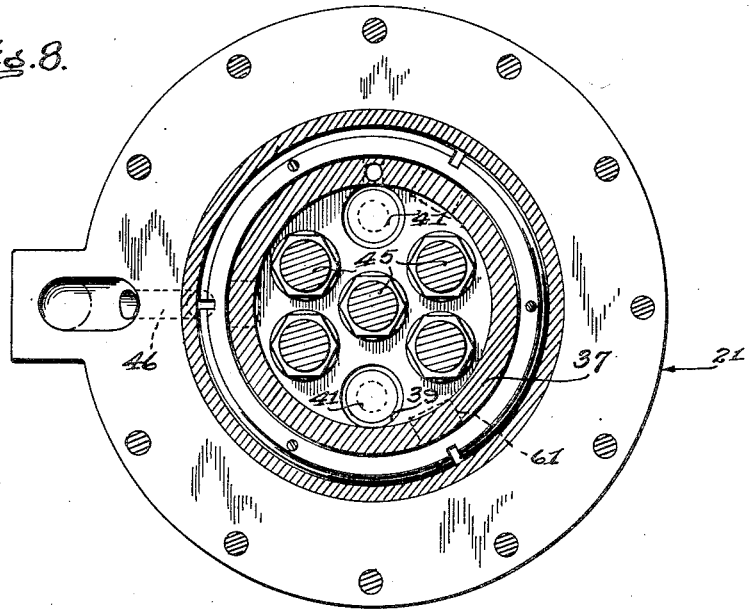

Fig. 8 is a sectional elevational view taken substantially along the line VIII—VIII of Fig. 4.

Figure 9:
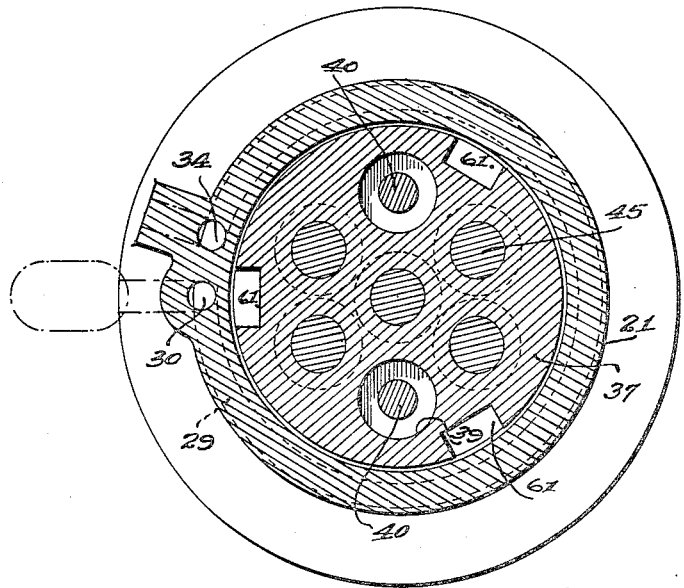

Fig. 9 is a sectional elevational view taken substantially along the line IX—IX of Fig. 4.

Fig. 10 is a sectional elevational view of the head showing the stopper removing device in its retracted position.

Fig. 11 is a sectional view taken along the line XI—XI of Fig. 10.

Fig. 12 is a sectional view taken along the line XII—XII of Fig. 10.

Fig. 13 is a detail perspective view of the stopper lifter and pusher.

Fig. 14 is a detail view showing the detent for holding the take-out in an inoperative position.

In more or less general terms the illustrated embodiment of the present invention comprises an annular series of stopper forming units mounted for rotation about a vertical axis and thereby brought in succession to a series of operating positions in one of which the units gather a plurality of mold charges of molten glass which are transformed into stoppers and later removed from said units. As indicated above each stopper forming unit is adapted to produce a number of stoppers during each and every cycle of operations and for this reason is provided with a plurality of stopper molds or cavities. The elements making up each stopper unit are to a greater or less degree intended to be substituted for the blank mold, plunger and associated parts comprising a unit standard equipment in the well known Owens type machine such as generaly disclosed in the La France Patent 1,185,687 granted June 6, 1916. For the greater part mechanisms employed in machines of the above type may be utilized in connection with my stopper machine for the purpose of effecting charge gathering contact between the units and a supply body of molten glass as well as for actuating certain of the parts of each unit, as will be apparent presently.

In the present invention the stopper forming units are identical in construction and operation, each being carried by a dipping frame 15 mounted on a rotary mold carriage 16 which in turn is rotatively supported on a stationary central column 17. Thus the units may be brought in succession to a charge gathering position and dipped by vertical movement of the frame 15 into a supply body of molten glass from which mold charges are obtained by suction. A hinge pin 18 depending from a forward extension 19 on the dipping frame 15 supports a head casting 20 from the lower side of which is suspended a lower neck mold carrier 21 forming a portion of one of the stopper forming units. An upper neck mold section 22 and a head mold section 23 are mounted above said casting 20 and adapted for periodic cooperation with the corresponding lower neck mold section 24 provided at the lower end of the neck mold carrier 21. These mold sections are capable of movement relative to each other and after each charging operation are so moved that the capacity of the mold is reduced to compact the glass. Such compacting of the glass obviously will increase its density and contribute very materially to the production of articles of uniformly high quality.

Figure 5:
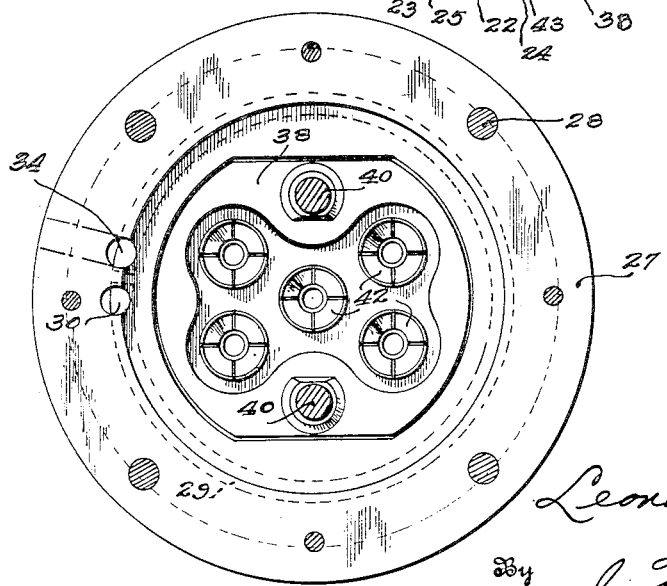
Fig. 5 is a sectional plan view taken substantially along the line V—V of Fig. 4.

Specifically, the construction of each stopper forming unit is substantially as follows. The lower neck mold carrier 21 (Figs. 1, 4, 6, and 7) consists of a vertical cylinder, to the lower end of which is separably attached a solid neck mold plate 25 having the lower neck mold sections 24 formed therein. These lower neck mold sections 24 consist of a series of vertical openings extending entirely through said plate 25 and shaped to form the lower portion of the stopper necks. Also these openings provide bottom inlets through which molten glass may be drawn by suction into the other cooperating mold sections. The neck mold plate 25 which has a continuous upstanding wall 26 and radial attaching flange 27 thereon, is separably connected to the carrier by attaching screws 28. Thus the plate may be removed without difficulty whenever necessary. Cooling of the mold plate 25 is obtained by constant circulation of low pressure cooling air through a passageway 29 in the wall 26 on said plate. This passageway 29 (Fig. 4) communicates at one end with a vertical conduit 30 provided in the mold carrier 21, said conduit leading to an opening 31 in the head casting 20 and thence to a pipe 32 the inner end of which is connected to an air supply chamber 33 in one of the posts of the mold carriage. An exhaust port 34 (Figs. 5 and 9) is provided at the other end of the passageway 29 so that the cooling air after having been forced through said passageway may be exhausted to the atmosphere.

The groups of head mold sections 23 and upper neck mold sections 22 for each unit are mounted upon a holder 35 which is arranged in register with the lower neck mold carrier 21 and separably connected to and supported by a vertical rack bar 36. This rack bar is adapted for vertical reciprocation, so that the mold sections carried by the holder 35 at the lower end of said bar may be placed within the lower neck mold carrier 21 at regular time intervals for cooperation with the lower neck mold sections 24 in forming complete stopper molds. Also, upward movement of the holder a predetermined distance separates the head and upper neck mold sections leaving finished stoppers supported in the latter. Sufficient additional movement upwardly will carry these mold sections while separated, to a position above the head casting 20 where the stoppers may be removed. The specific construction of the unit may be substantially as follows. A vertical sleeve piston 37 having closed upper and lower ends is separably connected by any conventional or preferred means to the lower end of the rack bar 36.

A plurality of the upper neck mold sections 22 are mounted in a carrier plate 38 which is suspended from the lower end of the sleeve piston 37 and so connected to the latter that said piston and plate are free to move vertically relative to each other as well as together at times. For the purpose of securing the carrier plate 38 and piston 37 together for limited relative movement, the piston is provided with a pair of diametrically opposed vertical cylinders 39 having bottom openings through which piston rods 40 extend for separable connection to said plate. Pistons 41 are connected to the upper ends of the rods 40 and slidingly arranged in the cylinders. Air under pressure is supplied to the upper ends of the cylinders 39 at regular time intervals to hold the neck molds together against premature separation. The construction by which this is accomplished includes an inlet port 41ª to which a conduit 41ᵇ is connected, the latter leading to a cam controlled valve 41ᶜ which regulates the passage of air through said conduit to the cylinders 39. A pipe 41ᵈ connects the valve to the air chamber 41ᵉ.

Each upper neck mold 22 consists of a ring arranged in and extending a short distance above the upper end of a vertical opening in the carrier plate 38 and provided at its upper end with an outwardly upwardly inclined surface 42 which forms a molding surface for shaping the lower side of the stopper heads. Vacuum slots 43 may be provided in the upper end of the upper neck molds to facilitate application of vacuum to the mold cavities. The upper neck mold sections 22 extend a short distance above the adjacent upper surfaces of the carrier plate 38 as previously pointed out so that the corresponding head molds 23 may telescope over said extended ends of the neck mold sections 22. This feature, as will be apparent presently, permits limited telescopic movement of the upper neck mold sections and the head molds whereby the capacity of the molds may be reduced after each charging operation so that the gathered mold charges of molten glass may be compacted. The advantages of this feature will be brought out hereinafter.

The head molds 23 which obviously correspond in number to that of the upper and lower neck molds are arranged between the upper neck mold plate 38 and the piston 37, and secured to the lower end of a plurality of piston rods 45 which extend into the upper end of the sleeve piston 37 where they are separably secured to the piston 46. Each head mold 23 consists of an inverted cup-like member including a continuous depending skirt portion 47 or flange, which is adapted to telescope over the upper end of the corresponding upper neck mold 22 at regular time intervals. For the purpose of facilitating the application of vacuum to the complete and assembled stopper molds, each head mold 23 is connected through passageways 48 to a chamber 49 provided between the lower end of the sleeve piston 37 and the lower neck mold plate 25, said chamber in turn being connected by means of a pipe 50 to a vacuum chamber 51. A valve 52 of conventional form is employed to regulate the application of vacuum down to a chamber 53 which is provided in the head casting 20. This chamber 53 is created by forming a circumferentially extending channel in the vertical wall of the opening in said head casting and fitting an adapter ring 54 in said opening, said ring being of such dimensions that it provides an inner wall for the chamber 53. This adapter ring 54 is provided with at least one radial port 55 (Fig. 4) opening into the chamber 53, which at times registers with an angular port 56 in a sleeve valve 57, the latter being slidingly arranged within the adapter and normally held by means of coil springs 58 at the upper end of said adapter so that the ports 55 and 56 are not in register with each other. The angular port 56 in the valve 57 has one end in vertical alignment with a passageway 59 which leads downwardly and communicates with an annular channel 60 formed in the inner face of the cylindrical carrier 21. This channel 60 is adapted during operation of the molds to communicate through a series of vertical passageways 61 in the sleeve piston 37 with the chamber 49. An adjustable valve operating member is carried by the holder for the head molds and upper neck molds and is adapted to move the sleeve valve 57 downwardly for bringing the ports 55 and 56 into register with each other substantially at the time the head molds and upper neck molds are brought into cooperative position. This valve operating device preferably consists of an internally threaded ring or collar 62 which is threaded upon an upstanding flange 63 at the upper end of the sleeve piston 37, said collar or ring having an inwardly directed flange 64 at its lower end for engagement with the upper surface of the sleeve valve 57.

It has been brought out heretofore that after each charge gathering operation including severing of the mold charges from the supply body of molten glass G, by means of a cut-off knife 65, the head molds and upper neck molds are moved relative to each other for the purpose of compacting said mold charges. This is accomplished by the introduction of air under pressure into the upper end of the sleeve piston 37 so that the piston 46 is moved downward a short distance. Such downward movement of the piston 46 results in corresponding downward movement of the head molds relative to the upper neck molds and the sleeve piston 37, the latter being limited in its downward movement by a shoulder 66 upon which the sleeve piston comes to rest. A pipe 67 (Figs. 1, 2, and 4) connects a cam control valve 68 and the upper end of the sleeve piston 37, said valve in turn being connected to the air supply pipe 41$^d$.

The various movements of the stopper forming units with respect to the mold carriage as well as movement of the various parts of each unit relative to each other are obtained by mechanism closely resembling the construction embodied in the well known Owens type bottle machine and disclosed in the La France patent identified heretofore in this specification. Briefly the construction is substantially as follows. The dipping frame 15 is connected through rods 68$^a$ and a bell crank lever 69 to a counter balancing weight (not shown) the function of which is well understood. A stationary cam 70 carried by the stationary central column 17 operates through a cam roll 71, slide 72, and suitable connector 73 to rock a lever 74 at regular time intervals, said lever being connected to the dipping frame 15 through which vertical movement is imparted to the stopper forming unit. Reciprocation of the rack bar 36 for the purpose of alternately raising and lowering the holder 35 for the head and upper neck molds, is obtained by a gear segment 75 pivoted to a horizontal hinge pin 76 carried by the dipping frame 15, said gear being connected through a rod 77 to a slide 78. A cam roll 79 on the slide runs in a stationary cam 80 which is shaped to reciprocate the slide radially of the mold carriage and thereby oscillate said gear segment 75 periodically. Obviously, such oscillation of the gear segment will reciprocate the rack bar and thereby move the holder 35 relative to the lower neck molds and their carrier.

At the conclusion of each cycle of operations, the various elements of each stopper forming unit assume the relative positions shown in Fig. 10 wherein the finished stoppers are supported by the upper neck molds at a point spaced a short distance below the head molds. Automatic mechanical means is employed to remove the finished stoppers from the upper neck molds and deliver them to a chute C which in turn may direct them to a conveyor or the like (not shown). This stopper removing mechanism or take-out (Figs. 1 and 10 to 13 inclusive) may be constructed in the following manner. A combined stopper lifting and pushing device 81 is mounted on horizontal slideways for reciprocation along a path extending radially of the mold carriage. This lifting and pushing device during its outward movement is adapted to first lift the finished stoppers out of the upper neck molds 22 and then push them off the neck mold plate 38 into the chute C. The specific construction of this lifter and pusher (Figs. 10 and 13) may include a horizontally disposed lifter plate 83 having a down turned forward end 84 or lip, which serves to direct said plate to its operative position beneath and in contact with the upper neck mold plate 38. A substantially U-shaped pusher 85 is connected to the lifter plate 83. The parallel arms 86 forming a part of the pusher are substantially coextensive with the lifter plate 83 and overlie the longitudinal marginal portions thereof. Tongues 87 on the pusher 85 fit into the slideways 82 which are arranged a short distance above the head casting 20.

The mechanism for operating the stopper lifter and pusher 81 is actuated by rocking of the gear segment 75, said mechanism including a lever 88 pivoted near its upper end to a horizontal hinge pin 89 and connected at its lower end to the lifting and pushing device 81 by means of a link 90. The hinge pin 89 (Figs. 1, 10, and 11) is supported on a pair of spaced vertical plates 91 which form a part of the dipping frame 15. The upper end portion of the lever 88 is bifurcated to thereby provide a pair of arms 92 between which the lower end of a second lever 93 is disposed, said second lever being pivoted near its lower end to the hinge pin 89 and having a cam roll 94 at its upper end riding in a cam slot 95 in the gear segment 75. Apertured lugs 96 on the levers 88 and 93 are connected by rods 97 which in turn carry coil springs 98, said springs being confined between said lugs 96 and adapted to be compressed periodically for a purpose which will be apparent presently. A finger 99 at the upper end of the lever 88 (Figs. 10 and 11) is normally held in its lowermost position (Fig. 10) by a detent 100 carried by a latch 101. With the finger 99 so positioned the lifting and pushing device is held in its retracted position and the coil springs 98 are compressed so that with release of the fingers 99 said springs will quickly expand and project the lifter and pusher and thereby remove the stoppers from the upper neck mold plate 38.

The detent 100 carried by the latch 101 is normally and yieldingly held in the position shown in Figs. 10 and 11 by means of a spring 102 associated with the pivoted latch 101. A cam 103 at the outer end of the latch 101 is positioned in the path of travel of the head mold holder 35 so that when the latter reaches a predetermined elevation it will withdraw the detent 100 and allow rocking of the lever 88 for the purpose of projecting the lifter and pusher as indicated above. Engagement between a lug 104 on the second lever 93 and a stop 105 on the lever 88, together with the presence of the cam slot 95 in the gear segment 75, limit the swinging movement of the levers and therefore the extent of projection of the stopper, lifter, and pusher. The lifting and pushing device 81 is automatically returned to its inoperative position by downward movement of the rack bar 36 and holder 35 supported thereby. Initial downward movement of the rack bar caused by rocking of the gear segment 75 disengages the holder from the cam 103 on said latch 101 so that the detent 100 is projected inwardly into the path of travel of the finger 99 on the lever 88. During the initial downward movement of the holder 35 (Figs. 1 and 10) the upper neck mold plate 38 is held against vertical movement by the application of air to the upper ends of the pistons 41. Continued rocking movement of the gear segment 75 for the purpose of lowering the rack bar 36 swings the connected levers 88 and 93 so that the lifting and pushing device 81 is returned to the position shown in Fig. 10 and the finger 99 on the lever 88 is again placed beneath the detent 100.

While the operation of the machine may to a greater or less degree be understood in view of the above description, a brief review thereof will now be set forth. The several mold plates and carrier of each stopper unit are relatively positioned as shown in Fig. 4 at the moment of contact between the lower end of the unit and the supply body of molten glass G. At the time of initial contact between the unit and the supply body of molten glass, a vacuum control valve 52 (Fig. 1) will be opened to thereby exhaust the air from the stopper mold cavities and fill the cavities with molten glass. The unit is then raised out of contact with the glass and a cut-off knife 65 moved across the lower end of the unit to sever the excess glass from the gathered mold charges and close the lower ends of the molds. At this point air under pressure is supplied to the upper end of the holder 35 for the purpose of moving the piston 46 downwardly a short distance and thereby effect relative movement between the head molds and upper neck molds. Thus the capacity of the molds is reduced and the gathered glass compacted. This results in the production of perfectly formed and exceptionally solid stoppers. This compacting operation is followed immediately by closing of the vacuum valve 52 and upward movement of the head mold and upper neck mold holder 35 through the head cavity 20. Air under pressure is supplied through the port 41ᵃ (Figs. 6 and 7) during the initial upward movement of the holder 35 to delay upward travel of the upper neck mold plate 38. When the pistons 41 (Figs. 6 and 7) are brought into engagement with the lower ends of the cylinder 39 the neck mold plate 38 will begin its upward movement with said holder 35. The valve 41ᶜ will be closed at the time the upper neck mold plate 38 begins to move upwardly with the holder 35. The stopper removing mechanism then operates as set forth above to push the group of stoppers into the delivery chute C.

Modifications may be resorted to within the spirit and scope of the appended claims.

What I claim is:

1. A stopper forming unit comprising three superposed separable mold sections having a cavity therein opening downwardly through the lower section, suction means for delivering a mold charge of molten glass to said cavity, a cut-off knife adapted to close the mold cavity at times, means for moving the upper mold section relative to the other sections to compact the glass and then causing relative movement between all of the sections to expose the upper portion of a finished stopper and remove the finished stopper from the lower mold section leaving it supported solely by the intermediate mold section, and means for lifting the stoppers upward through said intermediate mold section and thereby removing them from said intermediate section.

2. A stopper forming unit comprising three superposed separable mold sections having a cavity therein opening downwardly through the lower section, suction means for delivering a mold charge of molten glass to said cavity, a cut-off knife adapted to close the mold cavity at times, means for moving the upper mold section relative to the other sections to compact the glass and then causing relative movement between all of the sections to expose the upper portion of a finished stopper and remove the finished stopper from the lower mold section leaving it supported solely by the intermediate mold section, and automatic means actuated by relative movement of the mold sections for removing stoppers from the intermediate mold section.

3. A stopper forming unit comprising a three-section mold including top, bottom and intermediate sections and formed with a downwardly opening cavity, suction means for delivering glass to the cavity, a cut-off knife for closing the lower end of the cavity upon completion of the mold charging operation, means for effecting relative vertical movement between the mold sections to reduce the capacity of said cavity while the knife is in said closing position and thereby compact the gathered glass and transform it into a finished stopper, automatic means for separating the mold sections by a relative vertical movement, leaving the stopper supported in the intermediate section, and automatic means for lifting the stopper upward through said intermediate section and thereby discharge it from the mold.

4. A stopper forming unit comprising a head casting having a vertical opening therethrough, a cylinder mounted on the lower side of said casting in register with the opening, a plate closing the lower end of the cylinder and formed with vertical openings therein, each of said last mentioned openings constituting part of a stopper molding cavity, a sleeve piston mounted for movement into and out of said cylinder, superposed mold sections carried by said piston and movable relative to each other, said mold sections adapted to cooperate with the plurality of the vertical openings at times in forming complete stopper shaping molds, and means for delivering charges of molten glass to the molds by way of said plurality of vertical openings.

5. A stopper forming unit comprising a head casting having a vertical opening therethrough, a cylinder mounted on the lower side of said casting in register with the opening, a plate closing the lower end of the cylinder and formed with vertical openings therein, each of said last mentioned openings constituting part of a stopper molding cavity, a sleeve piston mounted for movement into and out of said cylinder, superposed mold sections carried by said piston and movable relative to each other, said mold sections adapted to cooperate with the plurality of the vertical openings at times in forming complete stopper shaping molds, means for delivering charges of molten glass to the molds by way of said plurality of vertical openings, means for closing the lower ends of said plurality of openings following the mold charging operation, and means for effecting relative movement between certain of the mold sections to thereby decrease the capacity of the molds and compact the gathered mold charges.

6. A stopper forming machine comprising a mold carriage mounted for rotation about a vertical axis, a stopper forming unit mounted for vertical movement on the carriage, said unit comprising upper and lower neck mold plates, a plurality of vertically aligned neck molds in said plates, a plurality of head molds in alignment with and above the neck molds, means operated by movement of the mold carriage to periodically bring said molds into position for cooperation with each other in forming a plurality of complete stopper cavities and for later lifting the head molds away from the neck mold plates and separating the neck molds by a relative vertical movement, leaving the stoppers supported in the upper neck mold plate, means for delivering mold charges of molten glass to the cavities, means for compacting the glass in said cavities, and automatic means for ejecting the stoppers from the upper neck mold plate by an upward movement therethrough after the molds have been separated.

7. A stopper forming machine comprising a mold carriage mounted for rotation about a vertical axis, a stopper forming unit mounted for vertical movement on the carriage, said unit comprising upper and lower neck mold plates, a plurality of vertically aligned neck molds in said plates, a plurality of head molds in alignment with and above the neck molds, means operated by movement of the mold carriage to periodically bring said molds into position for cooperation with each other in forming a plurality of complete stopper cavities and for later lifting the head molds away from the neck mold plates and separating the neck molds by a relative vertical movement, leaving the stoppers supported in the upper neck mold plate, means for delivering mold charges of molten glass to the cavities, means for compacting the glass in said cavities, and automatic means for ejecting the stoppers from the upper neck mold plate by an upward movement therethrough after the molds have been separated, said stopper ejecting means including mechanism actuated by separation of the molds.

8. In combination, a stopper forming unit including a horizontally disposed plate in which finished stoppers are supported preparatory to their removal from the unit, stopper removing means including a lifting and pushing device, a pair of levers pivoted to a common horizontal hinge pin, a compression spring arranged between portions of the levers, means connecting one lever to said lifting and pushing device, means for rocking the levers as a unit in one direction to inoperatively position said device, means for moving one lever about said hinge pin relative to the other lever to thereby compress said spring, and means whereby the spring is then allowed to expand and move said other lever and the lifting and pushing device connected thereto.

9. A stopper forming machine comprising superposed mold sections including top, bottom and intermediate sections, said sections formed with aligned mold cavities which together form a cavity substantially the shape of the finished stopper, means for introducing a charge of molten glass into the mold, means for separating the mold sections by a relative endwise movement thereof and thereby leaving the stopper supported within the intermediate mold section, and automatic means for ejecting the stopper by moving it endwise through said intermediate section.

10. A stopper forming machine comprising a bottom mold section and a second mold section thereover, said sections formed with aligned cavities therein, said bottom section having a bottom opening, means for introducing a charge of molten glass by suction into said aligned cavities through said bottom opening, means for separating said sections and withdrawing the molded stopper from the bottom section by a relative vertical movement of said sections, leaving the molded stopper supported in said second section with the portion of the stopper formed in the bottom section protruding downward below the said second section, and means for ejecting the stopper by an upward movement through said second mold section.

11. In a machine for forming glass stoppers, the combination of a sectional mold comprising upper, lower and intermediate mold sections formed with aligned cavities providing a complete mold cavity extending through the lower and intermediate sections and into the upper section, means for introducing a charge of glass into the mold cavity, means for withdrawing the uppermost section, means for separating the lowermost and intermediate sections by a relative vertical movement, and means for ejecting the stopper upwardly through the intermediate section.

12. A machine for forming glass articles comprising a body mold having a mold cavity extending therethrough and opening downward, a head mold having a mold cavity therein opening downward, said head mold arranged to surround the body mold with the latter projecting upwardly into the head mold cavity, means for introducing a charge of molten glass into the mold cavities through said bottom opening and filling said mold cavities, means for closing said bottom opening, means for then imparting a downward movement to the head mold relative to the body mold to compact the glass, and means for then separating the molds by a relative vertical movement.

13. A machine for forming glass articles comprising a body mold having a mold cavity extending therethrough and opening downward, a head mold having a mold cavity therein opening downward, said head mold arranged to surround the body mold with the latter projecting upwardly into the head mold cavity, means for introducing a charge of molten glass into the mold cavities through said bottom opening and filling said mold cavities, means for closing said bottom opening, means for then imparting a downward movement to the head mold relative to the body mold to compact the glass, means for then separating the molds by a relative vertical movement, leaving the molded article supported in the body mold, and automatic means for ejecting the molded article by an upward movement thereof through the body mold cavity.

14. A machine for forming glass articles comprising a body mold having a mold cavity extending therethrough and opening downward, a head mold having a mold cavity therein opening downward, said head mold arranged to surround the body mold with the latter projecting upwardly into the head mold cavity, means for introducing a charge of molten glass into the mold cavities through said bottom opening and filling said mold cavities, means for closing said bottom opening, means for then imparting a downward movement to the head mold relative to the body mold to compact the glass, and means for then separating the molds by a relative vertical movement, said body mold cavity having the upper portion of its walls upwardly and outwardly flared so that the area of the body mold cavity at the upper surface of the body mold is substantially coextensive with the head mold cavity at said surface.

Signed at Woonsocket, Rhode Island, this 25th day of September, 1931.

LEONARD D. SOUBIER.